(12) United States Patent
Liang

(10) Patent No.: US 10,310,535 B2
(45) Date of Patent: Jun. 4, 2019

(54) PORTABLE GREEN POWER DEVICE

(71) Applicant: TAIGULF CO., LTD., New Taipei (TW)

(72) Inventor: Che-Peng Liang, Kaohsiung (TW)

(73) Assignee: TAIGULF CO., LTD., New Taipei (TW)

(*) Notice: Subject to any disclaimer, the term of this patent is extended or adjusted under 35 U.S.C. 154(b) by 0 days.

(21) Appl. No.: 16/022,838

(22) Filed: Jun. 29, 2018

(65) Prior Publication Data

US 2018/0307261 A1 Oct. 25, 2018

Related U.S. Application Data

(63) Continuation-in-part of application No. 14/580,238, filed on Dec. 23, 2014.

(Continued)

(30) Foreign Application Priority Data

Mar. 3, 2014 (TW) .............................. 103107064 A
Mar. 3, 2014 (TW) .............................. 103203609 U

(51) Int. Cl.
G05F 1/67 (2006.01)
H02J 7/00 (2006.01)
(Continued)

(52) U.S. Cl.
CPC .......... *G05F 1/67* (2013.01); *H01M 10/0525* (2013.01); *H02J 7/0022* (2013.01); *H02J 7/0029* (2013.01);
(Continued)

(58) Field of Classification Search
CPC ........... H02J 7/35; H02J 7/355; Y02E 10/766; Y10T 307/718
See application file for complete search history.

(56) References Cited

U.S. PATENT DOCUMENTS 6,307,350 B1 10/2001 Alderman
9,284,016 B2 3/2016 Takamoto
(Continued)

FOREIGN PATENT DOCUMENTS

CN 101399461 A 4/2009
CN 101588078 A 11/2009
(Continued)

*Primary Examiner* — Daniel Kessie
(74) *Attorney, Agent, or Firm* — Cooper Legal Group, LLC

(57) ABSTRACT

A portable green power device includes a case, an energy storage module, a kinetic power generating module, a control unit, and a port for discharging. The energy storage module has an input terminal set, an output terminal set, a protection circuit, and a parallel dynamic self-balancing mechanism. The output terminal set may be connected to an additional energy storage unit to expand power storage capacity of the portable green power device. The parallel dynamic self-balancing mechanism enables synchronous charging and discharging under a voltage level which is dynamically reached and falls between voltages of all the energy storage units connected in parallel. The control unit tracks and collects energy generated by the kinetic power generating module at a maximum power point and allows transfer of the generated energy to the energy storage module.

8 Claims, 8 Drawing Sheets

Related U.S. Application Data

(60) Provisional application No. 61/919,819, filed on Dec. 23, 2013.

(51) Int. Cl.
  H02J 7/35 (2006.01)
  H01M 10/0525 (2010.01)
  H02J 7/02 (2016.01)

(52) U.S. Cl.
  CPC .......... H02J 7/0042 (2013.01); H02J 7/0055 (2013.01); H02J 7/35 (2013.01); H02J 7/0014 (2013.01); H02J 7/022 (2013.01); *H02J 2007/0037* (2013.01); *Y02E 10/58* (2013.01); *Y10T 307/658* (2015.04)

(56) References Cited

U.S. PATENT DOCUMENTS

| | | | |
|---|---|---|---|
| 2004/0064084 A1 | 4/2004 | Inoue | |
| 2004/0195025 A1 | 10/2004 | Kitamura | |
| 2005/0067203 A1 | 3/2005 | Uno | |
| 2006/0058023 A1 | 3/2006 | White | |
| 2006/0261785 A1 | 11/2006 | Horiuchi | |
| 2007/0252434 A1 | 11/2007 | Yang | |
| 2010/0015511 A1 | 1/2010 | Yoo | |
| 2010/0102568 A1 | 4/2010 | Bonin | |
| 2010/0109606 A1 | 5/2010 | Chan | |
| 2010/0196752 A1* | 8/2010 | Yue | H01M 2/0242 429/158 |
| 2011/0045335 A1 | 2/2011 | Lee | |
| 2011/0089888 A1 | 4/2011 | Kuo | |
| 2011/0163712 A1 | 7/2011 | Chen | |
| 2011/0263384 A1 | 10/2011 | Drazan | |
| 2012/0057333 A1 | 3/2012 | Bhardwaj | |
| 2012/0169270 A1 | 7/2012 | Cho | |
| 2012/0212067 A1* | 8/2012 | Lai | H02J 7/35 307/84 |
| 2012/0238406 A1 | 9/2012 | Beard | |
| 2013/0134787 A1 | 5/2013 | Sakakibara | |
| 2013/0209288 A1 | 8/2013 | Wang | |
| 2013/0257346 A1 | 10/2013 | Jakins | |
| 2014/0152025 A1* | 6/2014 | Renga | H02P 9/008 290/1 R |
| 2015/0171632 A1 | 6/2015 | Fry | |

FOREIGN PATENT DOCUMENTS

| | | |
|---|---|---|
| CN | 201663466 U | 12/2010 |
| CN | 201966662 U | 9/2011 |
| CN | 202091117 U | 12/2011 |
| CN | 103326434 A | 9/2013 |
| CN | 203839996 U | 9/2014 |
| TW | 529850 | 4/2003 |
| TW | I303508 | 11/2008 |
| TW | 201023474 | 6/2010 |
| TW | M420109 | 1/2012 |

* cited by examiner

PORTABLE GREEN POWER DEVICE

CROSS-REFERENCE TO RELATED APPLICATIONS

The present application is a continuation-in-part of and claims the benefit of U.S. non-provisional application Ser. No. 14/580,238, filed on Dec. 23, 2014, which claims the benefit of U.S. provisional application Ser. No. 61/919,819, filed on Dec. 23, 2013, the benefit of Taiwan application Ser. No. 103107064, filed on Mar. 3, 2014, and the benefit of Taiwan application Ser. No. 103203609, filed on Mar. 3, 2014. U.S. non-provisional application Ser. No. 14/580,238, U.S. provisional application Ser. No. 61/919,819, Taiwan application Ser. No. 103107064, and Taiwan application Ser. No. 103203609 are incorporated herein by reference in their entireties.

BACKGROUND OF THE INVENTION

1. Field of the Invention

The present invention relates to a portable green power device capable of storing kinetic energy generated by a human body or other moving mechanism, or of collecting energy received from a commercial power, and more particularly, to a portable green power device capable of expanding its power storage capacity by electrically connecting an external solar power generating device and/or an external wind power generating device or by electrically connecting additional numerous energy storage units in parallel.

2. Description of the Prior Art

With the advanced technology, various electronic and electrical products are widely used in daily life, and the energy consumption grows accordingly. Most of the traditional power supplies are fossil fuel-based, which have drawbacks of expensive costs and the exhausting resources. On the contrary, green energy received from solar and wind requires huge and very costly power generating equipment with geographical limits and is not as popular as expected to properly replace fossil fuel energy. In case of any natural or man-made disaster occurs, residents may lose power supply to drive household appliances while current power facilities are partially or completely shut down. The fossil fuel generator has been the most common emergent solution, but the fossil fuel may not be readily and constantly available. In contrast, a portable green power generator capable of self-generating energy, storing energy coming from environments, and expanding its power capacity would be a convenient, affordable, and immediate solution in the environment-friendly industry.

SUMMARY

The present invention provides a portable green power device capable of storing kinetic energy generated by a human body or other moving mechanism, or of collecting energy received from a commercial power, an external solar power generating device and/or an external wind power generating device. The portable green power device is also capable of expanding its power storage capacity by electrically including additional numerous energy storage units in parallel.

In one embodiment, the portable green power device includes a case, an energy storage module, a kinetic power generating module, a control unit, and a port.

The energy storage module is disposed in the case and has at least one energy storage unit provided with an input terminal set including at least one positive terminal and at least one negative terminal, an output terminal set including at least one positive terminal and at least one negative terminal, a protection circuit electrically connected to the input terminal set and the output terminal set to provide the energy storage unit with an over-charging threshold and an over-discharging threshold, and a parallel dynamic self-balancing mechanism disposed between the input terminal set and the output terminal set and connected to the input terminal set and the output terminal set.

The kinetic power generating module is disposed in the case and electrically connected to the input terminal set through the control unit. The kinetic power generating module includes a pair of magnetic components, an induction coil movably disposed between the magnetic components, a handle with a first end extending out of the case and a second end being connected to the induction coil. The first end of the handle is to be operated to move the induction coil relative to the magnetic components such that the kinetic power generating module generates an electrical energy.

The control unit is disposed in the case and electrically connected to the kinetic power generating module and the input terminal set to track a maximum power point of the electrical energy generated by the kinetic power generating module, collect the electrical energy generated by the kinetic power generating module at the maximum power point, and allow transfer of the electrical energy generated by the kinetic power generating module to the energy storage module. The control unit may include a maximum power point tracking (MPPT) circuit to detect electrical parameters of the electrical energy generated by the kinetic power generating module and track the maximum power point which may conform to a preset threshold. The control unit may be designed in association with any other power collecting/charging methods such as pulse-width modulation (PWM). Any power collecting/charging method should fall within the scope of the present invention.

The port is disposed on an outer surface of the case and electrically connected to the output terminal set to supply the energy stored in the energy storage module to an external device.

In addition, the parallel dynamic self-balancing mechanism has a plurality of parallel electricity conducting bridges with high electrical conductivity and high-power conductivity, two ends of each of the electricity conducting bridges respectively connect one positive terminal of the input terminal set and one positive terminal of the output terminal set or respectively connect one negative terminal of the input terminal set and one negative terminal of the output terminal set.

In another embodiment, the energy storage module has two energy storage units connected in parallel, and the parallel dynamic self-balancing mechanism conducts a current to actively flow within the energy storage module under a voltage level which is dynamically reached and falls between voltages of all the energy storage units.

In another embodiment, the output terminal set of the energy storage unit is electrically connected to an additional energy storage unit being structurally the same as the energy storage unit and disposed outside of the case such that the additional energy storage unit and the energy storage unit are connected in parallel, and the parallel dynamic self-balancing mechanism conducts a current to actively flow within the energy storage unit and the additional energy storage unit and under a voltage level which is dynamically reached and falls between voltage of the energy storage unit and voltage of the additional energy storage unit and enables expansion of a power storage capacity of the energy storage module.

The additional energy storage unit may be further electrically connected to a solar power generating module via another control unit which is used to drive the solar power generating module to transfer energy to the additional energy storage unit. Alternatively, the additional energy storage unit may be further electrically connected to a wind power generating module via another control unit which is used to drive the wind power generating module to transfer energy to the additional energy storage unit.

In another embodiment, the portable green power device may have a DC in-parallel connecting port disposed on the outer surface of the case and electrically connected to the parallel dynamic self-balancing mechanism to enable an in-parallel connection of the additional energy storage unit having the same structure as the energy storage unit and being disposed outside the case relative to the energy storage module.

In another embodiment, the portable green power device may have a lighting unit disposed on the case and electrically connected to the output terminal set of the energy storage unit.

In another embodiment, the portable green power device may have a commercial power receiving port on the case via which an alternating current (AC) charging module disposed outside the case and provided to transform AC power to direct current (DC) power may be electrically connected to the portable green power device, wherein the DC power is to be stored in the energy storage module.

In another embodiment, the AC charging module may include a conversion component to convert the AC power to the DC power.

The portable green power device as disclosed can effectively generate, collect and store energy, may be coupled with an adapter and/or an inverter, and may be applied to include an additional in-parallel energy storage unit of the same design. With such a consolidation and solution, the portable green power device conveniently provides sufficient energy in any regions with or without commercial power facilities.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
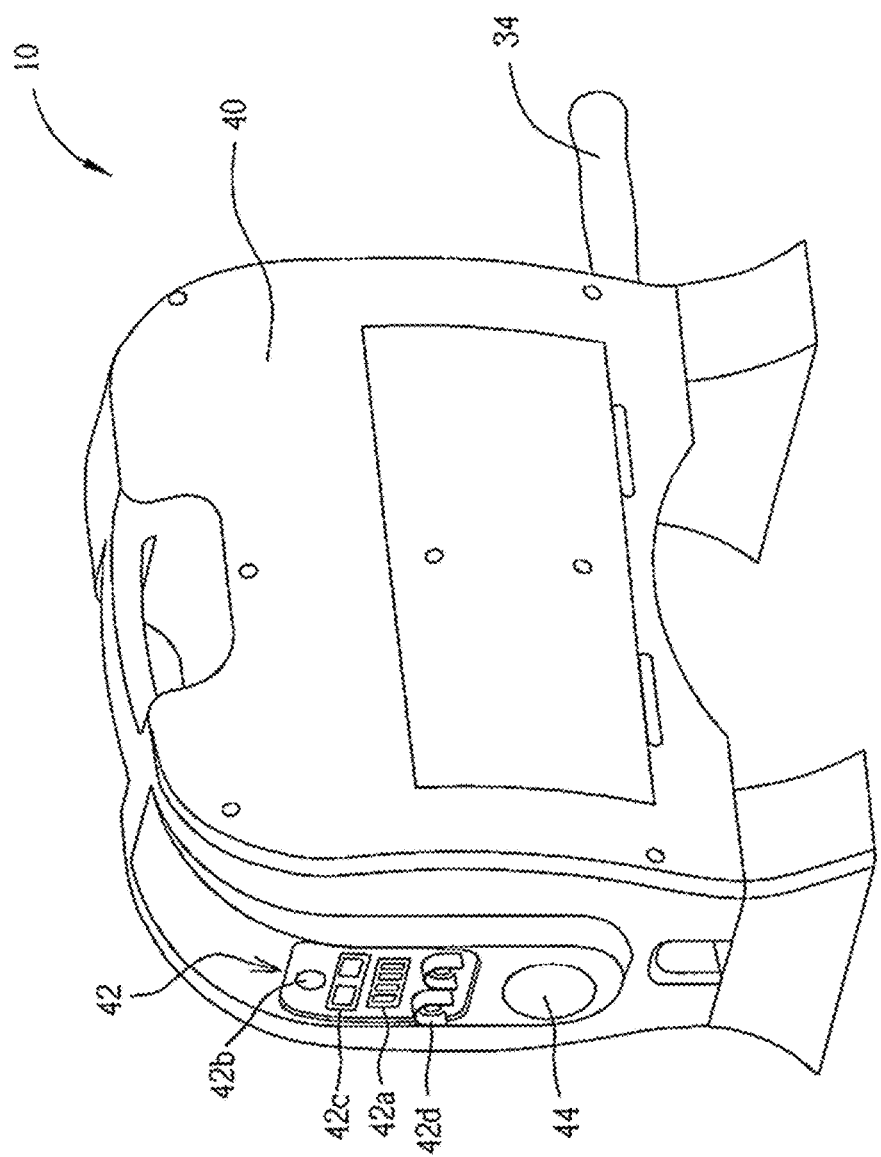
FIG. 1 is a diagram illustrating a portable green power device according to one embodiment of the present invention.
Figure 2:
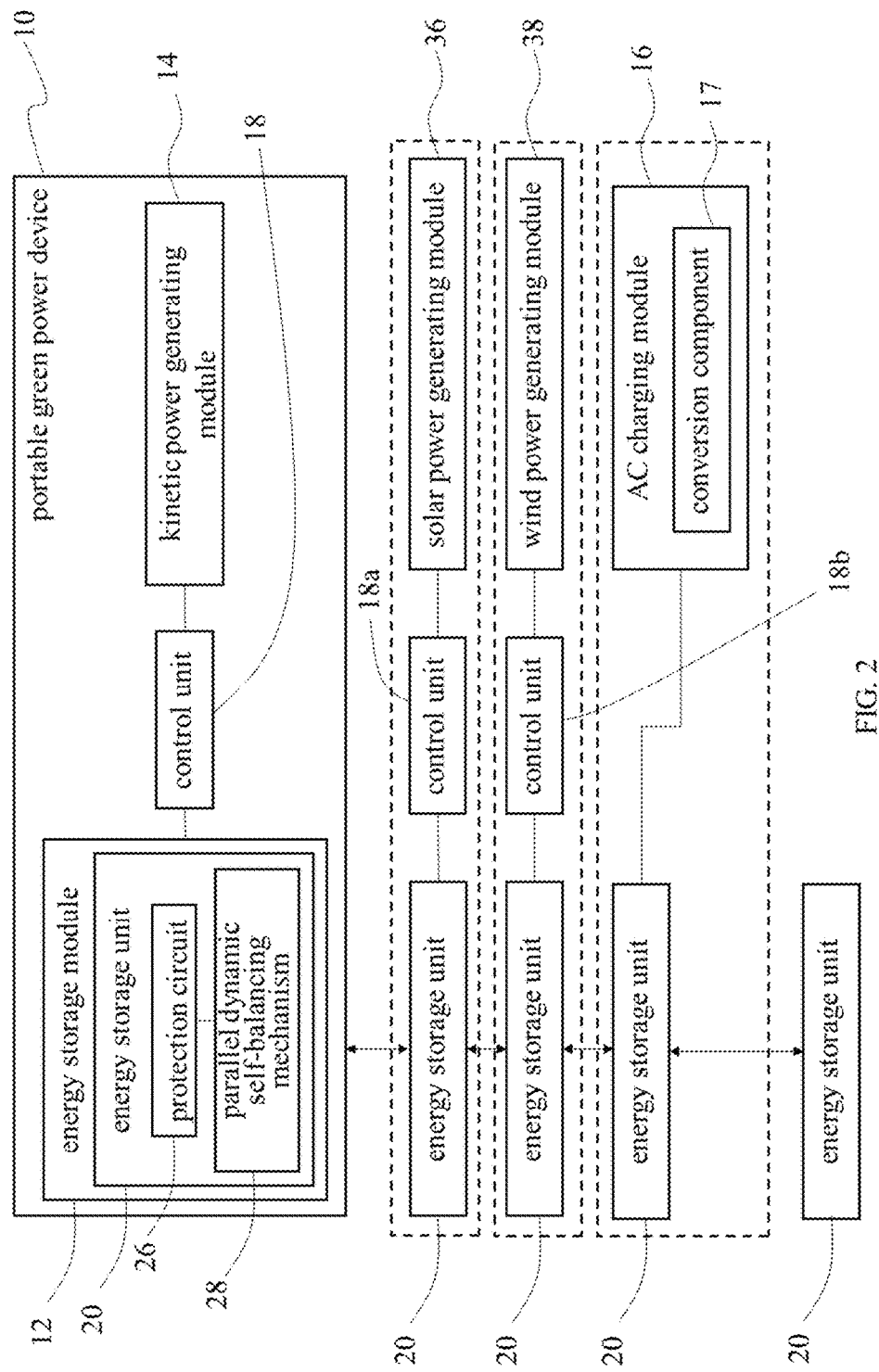
FIG. 2 is a functional block diagram of the portable green power device according to one embodiment of the present invention.

FIG. 1 is a diagram illustrating a portable green power device according to one embodiment of the present invention. FIG. 2 is a functional block diagram of the portable green power device according to one embodiment of the present invention. Referring to FIG. 1 and FIG. 2, the portable green power device 10 includes an energy storage module 12, a kinetic power generating module 14, a control unit 18, a case 40, a control panel 42, a lighting unit 44 and a handle 34. The energy storage module 12, the kinetic power generating module 14, and the control unit 18 are disposed in the case 40. The control panel 42 is disposed on an outer surface of the case 40. The handle 34 has a first end extending out of the case 40 and a second end being connected to the kinetic power generating module 14. The kinetic power generating module 14 is electrically connected to the energy storage module 12 via the control unit 18.

Referring to FIG. 2, the energy storage module 12 may be provided to perform an electrical energy charging and discharging, the kinetic power generating module 14 may be provided to generate kinetic power and transform the kinetic power to an electrical energy which may be then stored into the energy storage module 12. In one embodiment, the energy storage module 12 disposed in the case 40 may have one energy storage unit 20 or more than one energy storage unit 20 electrically connected in parallel. Each energy storage unit 20 may include a protection circuit 26 and a parallel dynamic self-balancing mechanism 28. The protection circuit 26 is disposed inside each energy storage unit 20 to provide each energy storage unit 20 with over-charging protection and over-discharging protection to ensure operation safety and prolong a lifespan of each energy storage unit 20 and the energy storage module 12. In one embodiment, the protection circuit 26 of each energy storage unit 20 of the energy storage module 12 may preferably be set to (1) provide an over-discharging threshold of a voltage level around 3.0 volts such as a voltage level ranging from 3.2 volts to 3.4 volts and an over-charging threshold of a voltage level around 4.0 volts such as a voltage level ranging from 4.1 volts to 4.2 volts, and (2) control a maximum discharging current I of a period of discharging time T not to be greater than 2C/T, where C is a rated capacity of each energy storage unit 20. In addition, a user may set for each energy storage unit 20 with a maximum discharging capacity threshold per discharging of 85% of a total of the rated capacity of the energy storage unit 20. On the other hand, the parallel dynamic self-balancing mechanism 28, which is not a processing circuit, is provided inside each energy storage unit 20 to conduct a current of charging and/or discharging to actively flow within one energy storage unit 20 and another in-parallel connected energy storage unit 20 under a dynamically reached voltage level falling between voltages of all the energy storage units 20. When an additional energy storage unit 20 being disposed outside the case 40 and structurally the same as the energy storage unit 20 of the energy storage module 12 is connected in-parallel to the energy storage module 12 disposed in the case 40, the parallel dynamic self-balancing mechanism 28 of each energy storage unit 20 conducts a current of charging and/or discharging to actively flow within the energy storage module 12 disposed in the case 40 and the additional energy storage unit 20 disposed outside the case 40 under a dynamically reached voltage level falling between voltage of the energy storage unit 20 in the case 40 and voltage of the additional energy storage unit 20 outside the case 40. The kinetic power generating module 14 may be actuated by any type of moving mechanism or motion of a human body. The control unit 18 may have a maximum power point tracking (MPPT) circuit to detect characteristics of the electrical energy generated by the kinetic power generating module 14 and collect the electrical energy at a maximum power point of the generated electrical energy to enhance charging efficiency of the energy storage module 12 disposed in the case 40 and of the in-parallel energy storage unit 20 disposed outside the case 40.

Still referring to FIG. 2, the energy storage module 12 of the portable green power device 10 disposed in the case 40 may externally connect in-parallel to an additional energy storage unit 20 which may be electrically connected to a solar power generating module 36 via another control unit 18a, to a wind power generating module 38 via another control unit 18b, or to an AC charging module 16 in a direct manner. In other words, the portable green power device 10 may be externally connected to the solar power generating module 36, the wind power generating module 38 or the AC charging module 16. In this way, the energy storage module 12 of the portable green power device 10 can be charged from more than one sources. The solar power generating module 36 and the wind power generating module 38 may independently operate or work together with the kinetic power generating module 14 to generate clean energy. The control unit 18a or 18b may also have a maximum power point tracking (MPPT) circuit. The AC charging module 16 may be provided to receive AC power from at least one commercial power facility and transform the AC power into DC power which is then may be stored into the energy storage module 12. The AC charging module 16 may include a conversion component 17, such as an AC-DC adapter, to perform the transformation. In one embodiment, the AC charging module 16 converts AC power of regular 100/250 volts to the DC power and the DC power is stored into the energy storage module 12. As a result, the portable green power device 10 has capability of receiving electrical energy via the AC charging module 16 in places where a commercial power facility is available and self-generating electrical energy via the kinetic power generating module 14 in places where the commercial power facility is not available. In other words, the portable green power device 10 allows users to obtain sufficient green power in any environment.

The solar power generating module 36 and the wind power generating module 38 are optionally selected and may respectively use the maximum power point tracking (MPPT) circuit inside the correspondingly connected control units 18a and 18b to control energy collecting of the correspondingly connected energy storage unit 20. Depending on amount and strength of the sunshine, the energy received by the solar power generating module 36 may not be periodic. Similarly, the unstable intensity variation of the wind-blow also makes the power generated by the wind power generating module 38 non-periodic. However, the control units 18a and 18b respectively in connection with the solar power generating module 36 and the wind power generating module 38 may detect the characteristics of the generated energy, track a maximum power point, and always control the solar power generating module 36 and the wind power generating module 38 to work at their maximum power points. In other embodiments, portable and foldable solar panels may be preferable for the solar power generating module 36 while a small efficient wind turbine may be preferable for the wind power generating module 38. The power types used, and the configuration designed for the solar power generating module 36 and the wind power generating module 38 are not limited hereto.

Figure 3:
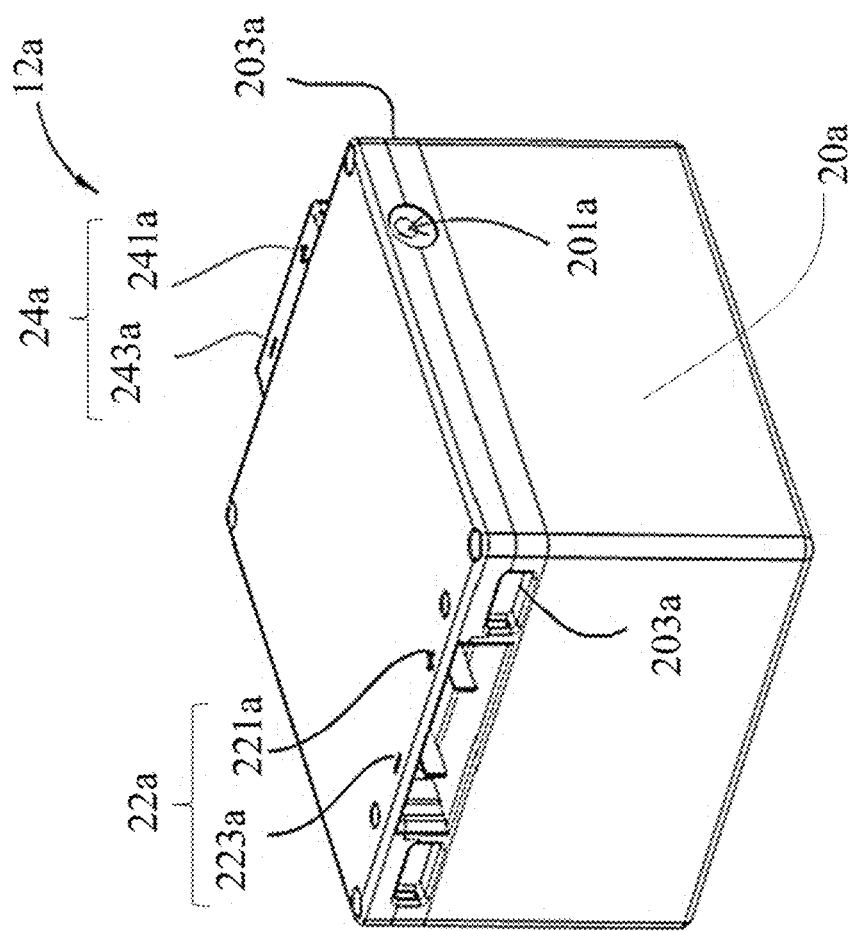
FIG. 3 is a diagram illustrating an energy storage module of the portable green power device with the energy storage module having one energy storage unit provided with one positive and one negative terminal for an input terminal set and an output terminal set according to one embodiment of the present invention.

FIG. 3 is a diagram illustrating an energy storage module of the portable green power device with the energy storage module having one energy storage unit provided with an input terminal set including one positive and one negative terminal and an output terminal set including one positive and one negative terminal according to one embodiment of the present invention. Referring to FIG. 3, the energy storage module 12a has only one energy storage unit 20a provided with an input terminal set 22a and an output terminal set 24a respectively placed on opposite sides of the energy storage unit 20a. The input terminal set 22a includes one positive terminal 221a and one negative terminal 223a while the output terminal set 24a includes one positive terminal 241a and one negative terminal 243a. The input terminal set 22a may be electrically connected to the kinetic power generating module 14 via the control unit 18. The output terminal set 24a may be electrically connected to any external device requiring the energy of the energy storage module 12a or electrically connected in-parallel to an additional energy storage unit 20a.

Figure 4:
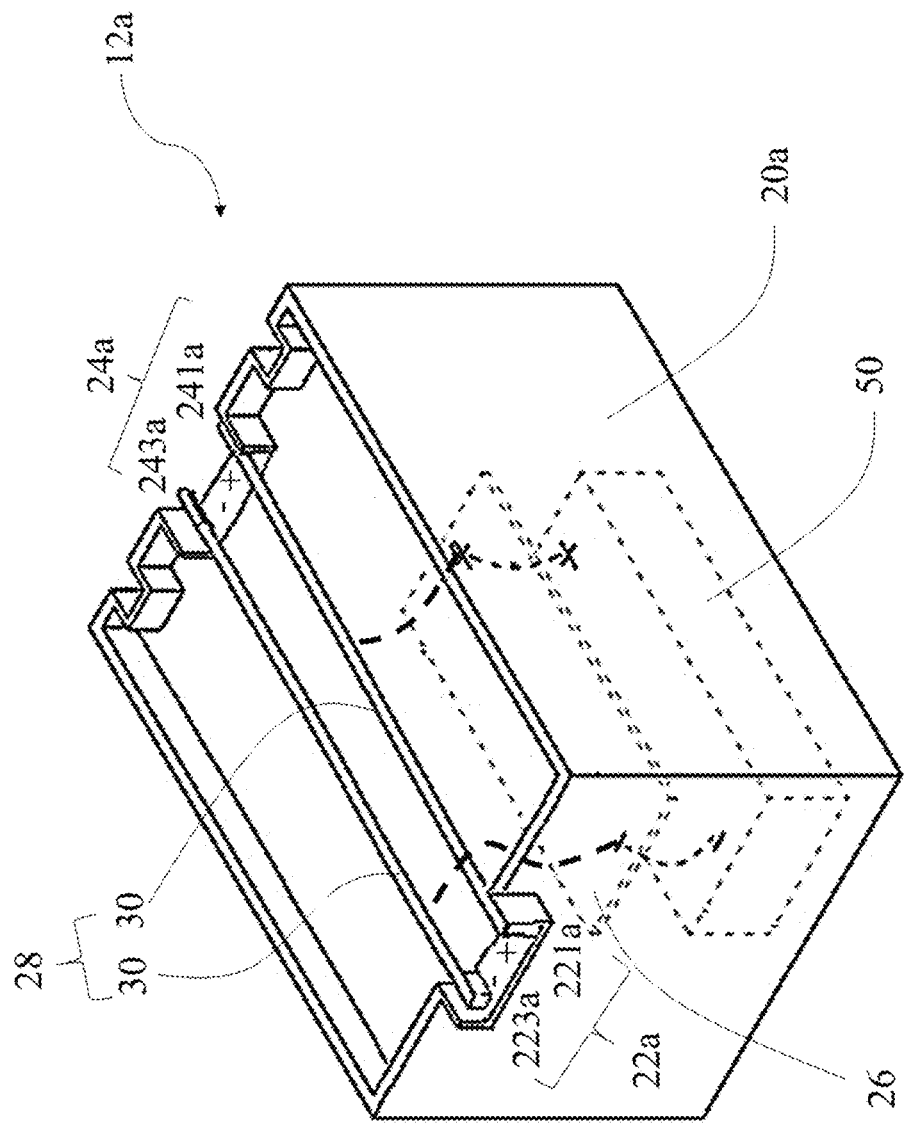
FIG. 4 is a diagram illustrating the inner structure of the energy storage module of FIG. 3 according to one embodiment of the present invention.

FIG. 4 is a diagram illustrating the inner structure of the energy storage module of FIG. 3 according to one embodiment of the present invention. As shown in FIG. 4, two parallel electricity conducting bridges 30, such as metal wires, are directly disposed between the input terminal set 22a and the output terminal set 24a with two ends of one electricity conducting bridge 30 respectively connecting the positive terminal 221a of the input terminal set 22a and the positive terminal 241a of the output terminal set 24a and two ends of the other one electricity conducting bridge 30 respectively connecting the negative terminal 223a of the input terminal set 22a and the negative terminal 243a of the output terminal set 24a to form the above-mentioned parallel dynamic self-balancing mechanism 28. The electricity conducting bridges 30 have high electrical conductivity and high-power conductivity to conduct current flow inside the energy storage unit 20a. One of the electricity conducting bridges 30 is connected to the positive terminals of the protection circuit 26 while the other one of the electricity conducting bridges 30 is connected to the negative terminals of the protection circuit 26. The electricity conducting bridges 30 are also further connected to the positive terminals and the negative terminals of one or more than one electrical energy storage cell 50 disposed inside the energy storage unit 20a. As a result, the positive terminals and the negative terminals of the protection circuit 26 are correspondingly connected with the positive terminals and negative terminals of the input terminal set 22a and the output terminal set 24a. Referring to FIG. 3 and FIG. 4, the disposal of the electricity conducting bridges 30, the input terminal set 22a and the output terminal set 24a enables dynamic balance of voltage of an additional energy storage unit 20a, which is connected in-parallel to the energy storage unit 20a of the energy storage module 12a, and voltage of the energy storage unit 20a of the energy storage module 12a inside the portable green power device 10. In other words, electrical charging and discharging of the energy storage module 12a and the additional energy storage unit 20a can be done simultaneously under a voltage level which is dynamically reached and falls between the voltages of all the energy storage units 20a. This dynamically reached voltage level naturally results from an electricity conduction by the electricity conducting bridges 30. In this way of charging and discharging, the efficiency and the lifespan of the energy storage module 12a can be secured and extended, respectively. The electrical energy storage cell 50 inside the energy storage unit 20a of the energy storage module 12a may preferably be a polymer lithium battery. In one embodiment, the energy storage module 12 disposed in the case 40 may be a combination of two energy storage units 20a electrically connected in parallel. The amount of the energy storage units 20a of the combination is adaptable and unlimited based on various needs and designs. As shown in FIG. 3, the electrical energy storage unit 20a of the energy storage module 12a may further include a DC charging port 201a to independently receive the energy from a commercial power facility via an adapter, and the electrical energy storage unit 20a of the energy storage module 12a may further include a plurality of integration joins 203a via which the in parallel connection of a plurality of the energy storage units 20a can be achieved. In addition, an appearance of the energy storage unit 20a is not limited hereto. The energy storage unit 20a of the energy storage module 12a of the portable green power device 10 may have an input terminal set 22a including more than one positive/negative terminals and an output terminal set 24a including more than one positive/negative terminals.

Figure 5:
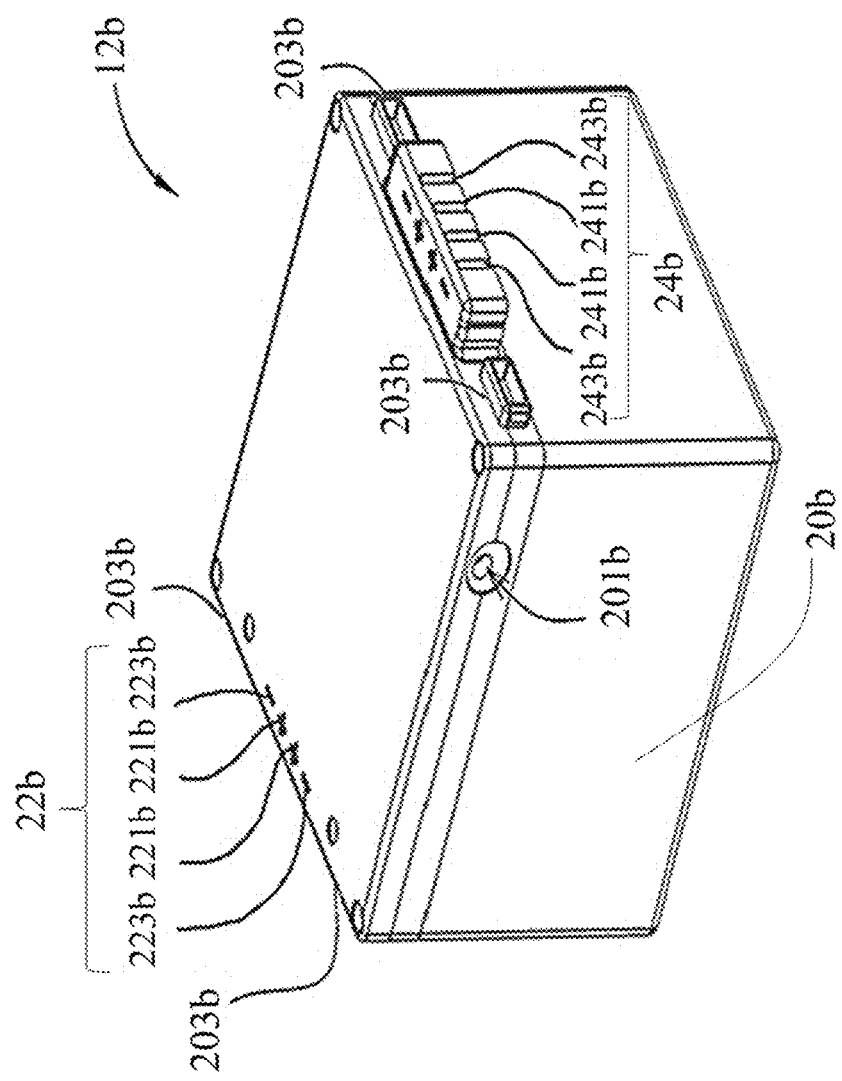
FIG. 5 is a diagram illustrating an energy storage module of the portable green power device with the energy storage module having one energy storage unit provided with two positive and two negative terminals for an input terminal set and an output terminal set according to another embodiment of the present invention.

FIG. 5 is a diagram illustrating an energy storage module of the portable green power device with the energy storage module having one energy storage unit provided with two positive and two negative terminals for an input terminal set and an output terminal set according to another embodiment of the present invention. Referring to FIG. 5, the energy storage module 12b has only one energy storage unit 20b provided with an input terminal set 22b and an output terminal set 24b respectively placed on opposite sides of the energy storage unit 20b. The input terminal set 22b includes two positive terminals 221b and two negative terminals 223b while the output terminal set 24b includes two positive terminals 241b and two negative terminals 243b. Being different from the energy storage unit 20a of FIG. 3, the input terminal set 22b includes two positive terminals 221b and two negative terminals 223b while the output terminal set 24b includes two positive terminals 241b and two negative terminals 243b. The input terminal set 22b may be electrically connected to the kinetic power generating module 14 via the control unit 18. The output terminal set 24b may be electrically connected to an external device requiring the energy of the energy storage module 12b or electrically connected in-parallel to the input terminal set 22b of an additional energy storage unit 20b. The input terminal set 22b and the output terminal set 24b may be utilized to control temperature increase.

Figure 6:
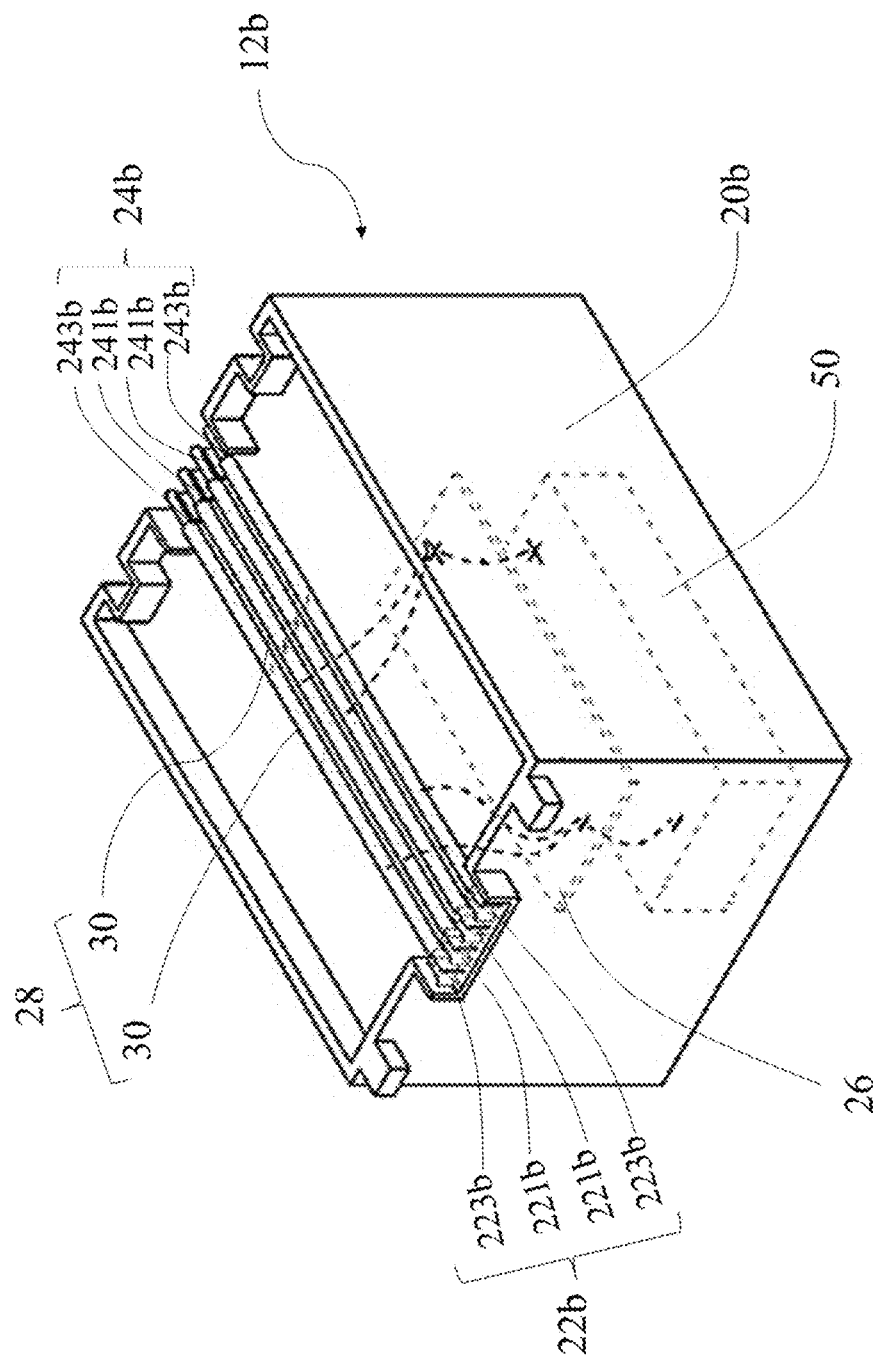
FIG. 6 is a diagram illustrating the inner structure of the energy storage module of FIG. 5 according to another embodiment of the present invention.

FIG. 6 is a diagram illustrating the inner structure of the energy storage module of FIG. 5 according to another embodiment of the present invention. As shown in FIG. 6, two parallel electricity conducting bridge sets or four parallel electricity conducting bridges 30 are directly disposed between the input terminal set 22b and the output terminal set 24b with two ends of each electricity conducting bridge 30 respectively connecting the positive terminal 221b of the input terminal set 22b and the positive terminal 241b of the output terminal set 24b or respectively connecting the negative terminal 223b of the input terminal set 22b and the negative terminal 243b of the output terminal set 24b to form the above-mentioned parallel dynamic self-balancing mechanism 28. The electricity conducting bridges 30 have high electrical conductivity and high-power conductivity to actively conduct current flow within more than one of the energy storage unit 20b in parallel. The electricity conducting bridges 30 connecting the positive terminals 221b of the input terminal set 22b and the positive terminals 241b of the output terminal set 24b are connected to the positive terminals of the protection circuit 26 while the electricity conducting bridges 30 connecting the negative terminals 223b of the input terminal set 22b and the negative terminals 243b of the output terminal set 24b are connected to the negative terminals of the protection circuit 26. The electricity conducting bridges 30 connecting the positive terminals 221b of the input terminal set 22b and the positive terminals 241b of the output terminal set 24b are further connected to the positive terminals of one or more than one electrical energy storage cell 50 disposed inside the energy storage unit 20b while the electricity conducting bridges 30 connecting the negative terminals 223b of the input terminal set 22b and the negative terminals 243b of the output terminal set 24b are further connected to the negative terminals of one or more than one electrical energy storage cell 50 disposed inside the energy storage unit 20b. As a result, the positive terminals and the negative terminals of the protection circuit 26 are correspondingly connected with the positive terminals and negative terminals of the input terminal set 22b and the output terminal set 24b. Referring to FIG. 5 and FIG. 6, the disposal of the electricity conducting bridges 30, the input terminal set 22b and the output terminal set 24b enables dynamic balance of voltage of an additional energy storage unit 20b, which is connected in-parallel to the energy storage unit 20b of the energy storage module 12b, and voltage of the energy storage unit 20 of the energy storage module 12b inside the portable green power device 10. In other words, electrical charging and discharging of the energy storage module 12b and the additional energy storage unit 20b can be done simultaneously under a voltage level which is dynamically reached and falls between the voltages of all the energy storage units 20b. This dynamically reached voltage level naturally results from an electricity conduction by the electricity conducting bridges 30. In this way of charging and discharging, the efficiency and the lifespan of the energy storage module 12b can be secured and extended, respectively. The electrical energy storage cell 50 inside the energy storage unit 20b of the energy storage module 12b may preferably be a polymer lithium battery. In one embodiment, the energy storage module 12b disposed in the case 40 may have a combination of two energy storage units 20b electrically connected in parallel. The amount of the energy storage units 20b of the combination is adaptable and unlimited based on various needs and designs. As shown in FIG. 5, the electrical energy storage unit 20b of the energy storage module 12b may include a DC charging port 201b to independently receive the energy from a commercial power facility via an adapter, and the electrical energy storage unit 20b of the energy storage module 12b may further include a plurality of integration joins 203b via which the in parallel connection of a plurality of the energy storage units 20b can be achieved. In addition, an appearance of the energy storage unit 20b is not limited hereto. The energy storage unit 20b of the energy storage module 12b of the portable green power device 10 may have an input terminal set 22b including more than two positive/negative terminals and an output terminal set 24b including more than two positive/negative terminals.

Figure 7:
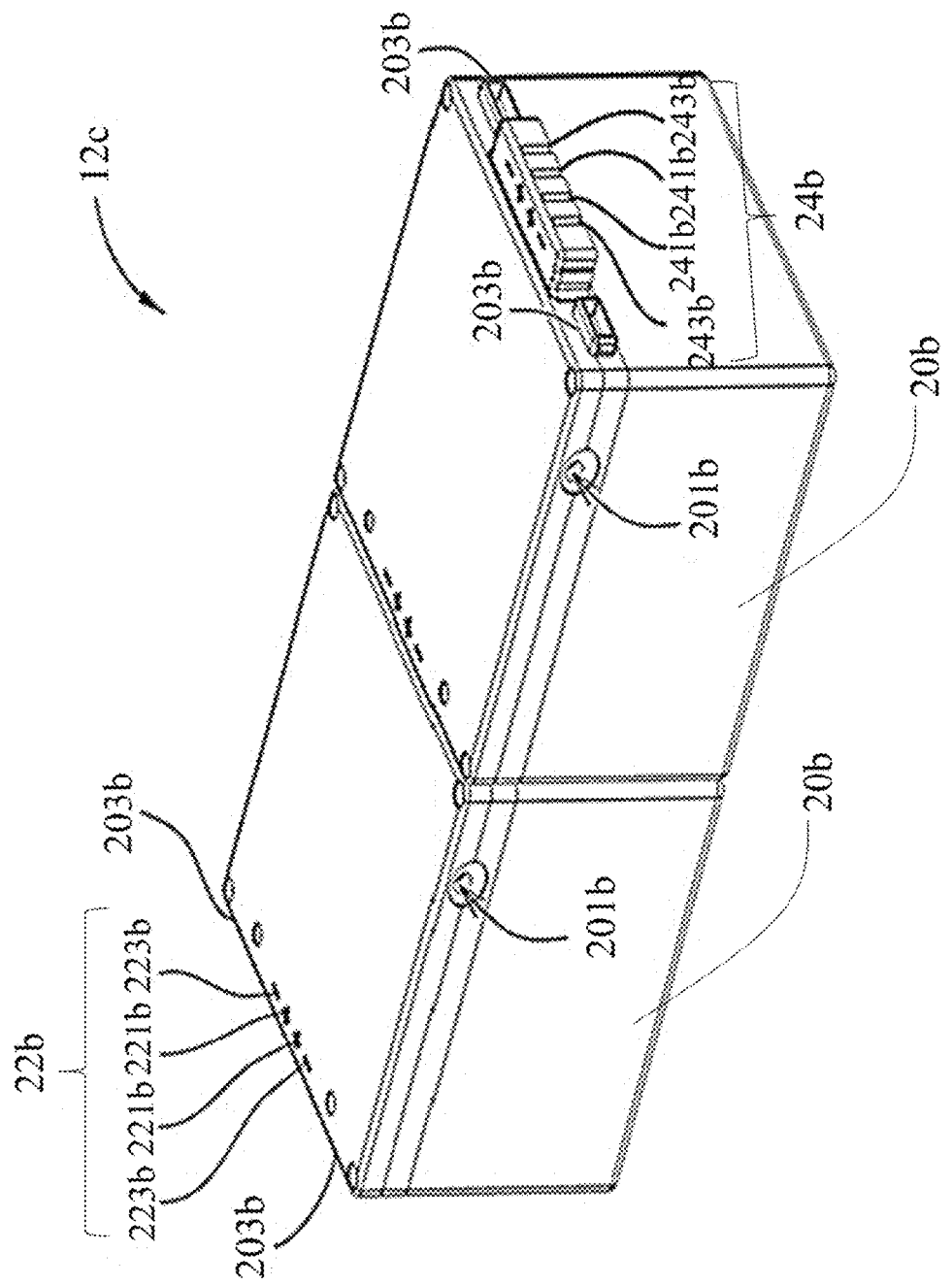
FIG. 7 is a diagram illustrating an energy storage module having two energy storage units electrically connected in parallel according to the still another embodiment of the present invention.

FIG. 7 is a diagram illustrating an energy storage module having two energy storage units electrically connected in parallel according to still another embodiment of the present invention. The energy storage module 12c has two energy storage unit 20b as shown in FIG. 5. The two energy storage units 20b are connected in parallel. Referring to FIGS. 2, 5, and 6, the parallel dynamic self-balancing mechanism 28 may be a combination of a plurality of parallel electricity conducting bridges 30 having high electrical conductivity and high-power conductivity and being disposed inside each of the energy storage unit 20b. As shown in FIG. 6, two ends of each of the parallel electricity conducting bridges 30 respectively connect one positive terminal of the input terminal set and one positive terminal of the output terminal set or respectively connect one negative terminal of the input terminal set and one negative terminal of the output terminal set. The parallel dynamic self-balancing mechanism 28 enables dynamic balance of voltage of one of the energy storage units 20b and voltage of the other one of the energy storage units 20b no matter whether all the energy storage units 20b are charged with an electrical energy from the kinetic power generating module 14 or the AC charging module 16 or discharged by an external device connected to the portable green power device 10. As a result, the parallel dynamic self-balancing mechanism 28 conducts any current of charging or discharging to actively flow within the energy storage module 12c under a voltage level which is dynamically reached and falls between voltages of all the energy storage units 20b. In other words, electrical charging and discharging of the energy storage module 12c can be done simultaneously under a dynamically reached voltage level falling between the voltages of all the energy storage units 20b. This dynamically reached voltage level naturally results from an electricity conduction by the electricity conducting bridges 30. In this way of charging and discharging, the efficiency and the lifespan of the energy storage module 12c can be secured and extended, respectively. Moreover, the power capacity of the energy storage module 12c in the case 40 can be simultaneously expanded via in-parallel connection with other external energy storage units 20b disposed outside the case 40. In this case, the parallel dynamic self-balancing mechanism 28 enables the output/input voltage levels of each energy storage unit 20b of each energy storage module 12c and of the external energy storage units 20b to be naturally balanced among all the in-parallel connected energy storage units 20b until the output/input voltage levels of all the in-parallel connected energy storage units 20b dynamically reach a voltage level falling between voltages of all the in-parallel connected energy storage units 20b and this dynamic reached voltage level drives the charging and/or discharging current to actively flow within all the energy storage units 20b in an efficient manner. In this way, a newly in-parallel joined energy storage unit 20b to the energy storage module 12c, of which a balanced voltage level of all the joined energy storage units 20b has been reached, will immediately cause all the output/input voltages of this new in-parallel combination (including the newly joined energy storage unit 20b and the energy storage module 12c) to actively balance again till the new combination reach a new voltage level falling between voltages of all the joined energy storage units 20b within a certain period of time. Therefore, the combination of the in-parallel energy storage units 20b electrically connected with each other can be stably charged and/or discharged in synchrony under a balanced voltage level to keep the high efficiency and the long-term lifespan of all the energy storage units 20b. The amount of the energy storage units 20b to be combined in parallel are not limited hereto and may depend on actual demand.

Figure 8:
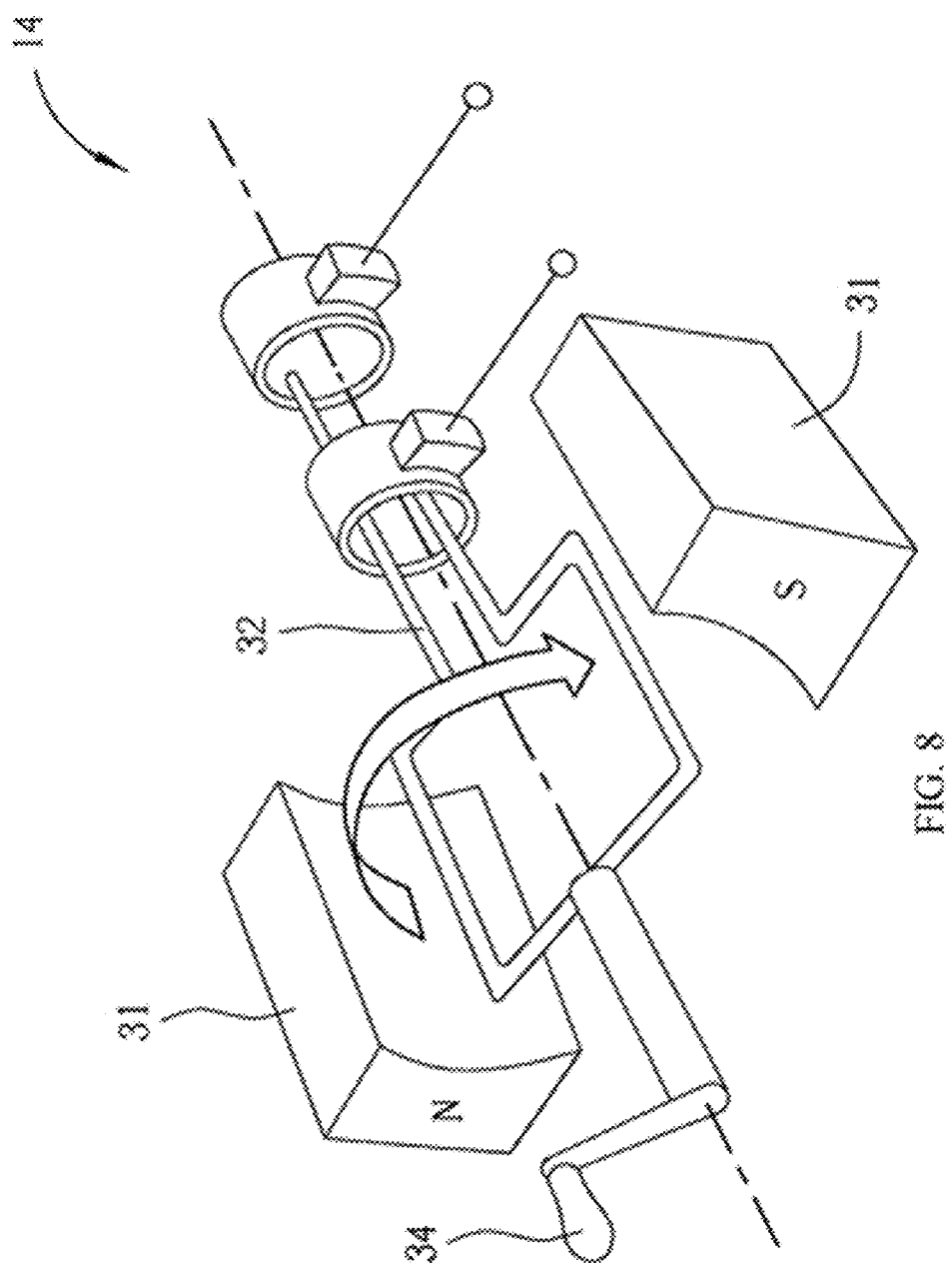
FIG. 8 is a diagram illustrating a kinetic power generating module of the portable green power device according to one embodiment of the present invention.

FIG. 8 is a diagram illustrating a kinetic power generating module of the portable green power device according to one embodiment of the present invention. Referring to FIGS. 1, 2 and 8, the kinetic power generating module 14 may include a pair of magnetic components 31 and an induction coil 32. The induction coil 32 is movably disposed between the magnetic components 31. The induction coil 32 is connected to the second end, which is inside the case 40, of the handle 34. A user of the portable green power device 10 may operate the first end of the handle 34 to move the induction coil 32 relative to the magnetic components 31 such that the induction coil 32 generates electricity according to electromagnetic induction. The electricity generated by the kinetic power generating module 14 is then transferred to the energy storage module 12 for storage and/or to be used by any external device requiring the energy. In this embodiment, the induction coil 32 is rotated relative to the magnetic components 31. In other embodiments, the inductive coil 32 may be linearly moved relative to the magnetic components 31 depending on the design of the kinetic power generating module 14. Mechanism of the kinetic power generating module 14 is thereof not limited and a detailed description is omitted herein for simplicity.

Referring again to FIG. 2, the control unit 18 may have a maximum power point tracking (MPPT) circuit used to detect the electrical parameters of the electrical energy generated by the kinetic power generating module 14 such as main loop DC voltage and output current. Additionally, the MPPT circuit may be provided with a multiplier to calculate the product of the DC voltage value and the output current value to obtain the instant output power of the electrical energy generated by the kinetic power generating module 14. The MPPT circuit may further be provided with a comparator to compare the output power before and after applying the kinetic power generating module 14 and calculating the variation via current perturbation method to accomplish the maximum power point track. The power of the electrical energy generated by the kinetic power generating module 14 may not periodically change as the operator's strength intensity, which corresponds to the rotational speed of the induction coil 32, changes. Specifically, the control unit 18 can instantly detect the electrical power of the electrical energy generated by the kinetic power generation module 14 and compare the detected power with the previously recorded power. By adjusting the duty cycle of MOSFETs (Metal-Oxide-Semiconductor Field-Effect Transistor, MOSFET) to change the average current that goes through the perturbation resistance, the control unit 18 can find out the maximum power point from the output current/voltage changes. The maximum power point can therefore be conformed to or greater than a preset threshold which is decided on the power generating module types and the environments in which the power generating modules will be used. As a result, the control unit 18 can control the operation of the kinetic power generating module 14 to always remain at the maximum power point and enable fast charging to full of the energy storage module 12 or the combination of a plurality of energy storage units 20 connected in parallel. The MOSFETs may be replaced by diodes or any other electronic components depending on the needs of the designs. The power collecting mechanism for the kinetic power generating module 14 is not limited hereto, and the foresaid combination of the kinetic power generation module 14 and the control unit 18 is not the only choice for the portable green power device 10. Any other power collecting/storing mechanisms applied to the kinetic power generation module 14 may also be allowed.

Referring to FIG. 1, the control panel 42 may be provided with at least one DC in-parallel connecting port 42a to enable in-parallel connection of at least one additional energy storage unit having the same structure as the energy storage unit 20 and being disposed outside the case 40 to the energy storage module 12 inside the case 40. Specifically, the DC in-parallel connecting port 42a may be electrically connected to the parallel dynamic self-balancing mechanism 28 of the energy storage module 12a, as shown in FIG. 4, inside the case 40 or connected to the parallel dynamic self-balancing mechanism 28 of the energy storage module 12b, as shown in FIG. 6, inside the case 40. When several external energy storage units 20 are in parallel connection with the energy storage module 12 inside the case 40 via the DC in-parallel connecting port 42a, the portable green power device 10 can further receive energy from the outside disposed solar power generating module 36 and/or the wind power generating module 38 and/or output energy to the outside disposed devices. The control panel 42 may also be provided with a commercial power receiving port 42b electrically connected to the AC charging module 16 disposed outside the case 40. The control panel 42 may also be provided with one or more low voltage DC discharging ports 42c and one or more DC-to-AC inverting ports 42d. The low voltage DC discharging ports 42c and the DC-to-AC inverting ports 42d may be electrically connected to the output terminal set 24a of the energy storage unit 20a, as shown in FIG. 3, inside the case 40 or connected to the output terminal set 24b of the energy storage unit 20b, as shown in FIG. 5, inside the case 40. The low voltage DC discharging port 42c may be in form of a Universal Serial Bus (USB) port used for charging any external portable electronic products requiring low voltage DC such as 5 volts, which means that the energy storage module 12a or 12b is to be discharged. The DC-to-AC inverting port 42d may be configured for insertion of an inverter (not shown) utilized to transform the DC power from the energy storage module 12 in the case 40 into the AC power for supplying electricity to an external device such as a household appliance requiring the energy from 100 watts to 500 watts or more, depending on the specifications of inverters, but should not exceed 950 watts for safety. The amount and configuration of the ports 42a, 42b, 42c and 42d and the relevant arrangement between these ports and the inner structure of the portable green power device 10 are not limited hereto. On the other hand, the lighting unit 44 may preferably be a light emitting diode with high photoelectric characteristics such as low power consumption, high color rendering index, and no flicker. In one embodiment, the lighting unit 44 may be electrically connected to the output terminal set 24a of the energy storage unit 20a, as shown in FIG. 3, inside the case 40 or connected to the output terminal set 24b of the energy storage unit 20b, as shown in FIG. 5, inside the case 40 to provide sufficient outdoor illumination only by low DC power consumption.

In conclusion, the disclosed portable green power device can independently generate power via the kinetic power generating module and even to transfer energy from the solar power generating module and/or the wind power generating module. Especially, the maximum power point tracking (MPPT) circuit of the control unit particularly effectively enhance the charging efficiency of the energy storage units by controlling each power generating module to always remain at the maximum power point. In addition to the regular protection circuit, the energy storage unit is provided with plural input and output terminals for thermal control and provided with the parallel dynamic self-balancing mechanism to allow voltages of all the in-parallel energy storage units to actively vary and dynamically reach a balanced level falling between the voltages of all the in-parallel energy storage units in a limited period. Therefore, the power capacity of the portable green power device may be expanded by connecting numerous same energy storage units in parallel and the portable green power device can be charged and/or discharged synchronously without damaging the efficiency and the lifespan of the connected energy storage units. The input terminal set and the output terminal set of each energy storage unit allow the portable green power device to receive energy from the abovementioned power generating modules and, in the meantime, to output power to external devices that require power to operate. With the adapter and the inverter, the portable green power device 10 can exchange the AC power and the DC power therebetween. In regions where the commercial power facilities are available, the portable green power device may be conveniently charged through the AC charging module. In the regions without the power supply facilities, users can still conveniently and easily obtain power from the disclosed portable green power device via the kinetic power generating module. Being different from the prior art, the disclosed the portable green power device not only effectively generates, collects and stores green energy but also makes green energy transportable, makes power storage flexibly expandable, and ensures a long-term lifespan of each of the energy storage units included.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable green power device, comprising:
a case;
an energy storage module being disposed in the case and having at least one energy storage unit, wherein each of the at least one energy storage unit is provided with at least one electrical energy storage cell disposed inside the energy storage unit, an input terminal set including at least one positive terminal and at least one negative terminal, an output terminal set including at least one positive terminal and at least one negative terminal, a protection circuit directly connected to the input terminal set and the output terminal set to provide the energy storage unit with an over-charging threshold and an over-discharging threshold, and a parallel dynamic self-balancing mechanism disposed between the input terminal set and the output terminal set and connected to the input terminal set and the output terminal set to conduct a charging current or discharging current to actively flow within the at least one energy storage unit under a voltage level which is dynamically reached and falls between voltages of all the energy storage units, wherein at least one of:
  the input terminal set includes at least two positive terminals and at least two negative terminals and two terminals of a first polarity are disposed between one terminal of a second polarity and another terminal of the second polarity, or
  the output terminal set includes at least two positive terminals and at least two negative terminals and two terminals of a first polarity are disposed between one terminal of a second polarity and another terminal of the second polarity;
a kinetic power generating module being disposed in the case and electrically connected to the input terminal set through a control unit, the kinetic power generating module including a pair of magnetic components, an induction coil movably disposed between a first magnetic component of the pair of magnetic components and a second magnetic component of the pair of magnetic components, a handle with a first end extending out of the case and a second end being connected to the induction coil, the first end of the handle being operated to move the induction coil relative to the pair of magnetic components to enable the kinetic power generating module to generate an electrical energy;
the control unit being disposed in the case and directly connected to the kinetic power generating module and the input terminal set to detect electrical parameters of the electrical energy generated by the kinetic power generating module, track a maximum power point of the electrical energy generated by the kinetic power generating module, collect the electrical energy generated by the kinetic power generating module at the maximum power point, and allow transfer of the electrical energy generated by the kinetic power generating module to the energy storage module; and
a port disposed on an outer surface of the case and electrically connected to the output terminal set to supply energy stored in the energy storage module to an external device;
wherein the parallel dynamic self-balancing mechanism has a plurality of parallel electricity conducting bridges, each of the electricity conducting bridges being a metal wire with high electrical conductivity and high-power conductivity, two ends of each of the electricity conducting bridges respectively connect one positive terminal of the input terminal set and one positive terminal of the output terminal set or respectively connect one negative terminal of the input terminal set and one negative terminal of the output terminal set, one of the electricity conducting bridges is connected to a positive terminal of the protection circuit and further connected to a positive terminal of the electrical energy storage cell while another one of the electricity conducting bridges is connected to a negative terminal of the protection circuit and further connected to a negative terminal of the electrical energy storage cell to enable electrical connection between the positive terminal of the protection circuit and the positive terminals of the input terminal set and the output terminal set and to enable electrical connection between the negative terminal of the protection circuit and the negative terminals of the input terminal set and the output terminal set, and the dynamically reached voltage level is naturally resulted from an electricity conduction by the electricity conducting bridges.

2. The portable green power device of claim 1, wherein the output terminal set of the energy storage unit is electrically connected to an additional energy storage unit being structurally the same as the energy storage unit and disposed outside the case to enable connection of the additional energy storage unit and the energy storage unit in parallel, and the parallel dynamic self-balancing mechanism conducts a current to actively flow within the energy storage unit and the additional energy storage unit under a voltage level which is dynamically reached and falls between a voltage of the energy storage unit and a voltage of the additional energy storage unit and enables expansion of a power storage capacity of the energy storage module.

3. The portable green power device of claim 2, wherein the additional energy storage unit is electrically connected to a solar power generating module via another control unit which is used to drive the solar power generating module to transfer energy to the additional energy storage unit.

4. The portable green power device of claim 2, wherein the additional energy storage unit is electrically connected to a wind power generating module via another control unit which is used to drive the wind power generating module to transfer energy to the additional energy storage unit.

5. The portable green power device of claim 1, further comprising:
  at least one DC in-parallel connecting port disposed on the outer surface of the case and electrically connected to the parallel dynamic self-balancing mechanism to enable an in-parallel connection of an additional energy storage unit having the same structure as the energy storage unit and being disposed outside the case to the energy storage module.

6. The portable green power device of claim 1, further comprising:
  a lighting unit disposed on the case and electrically connected to the output terminal set of the energy storage unit.

7. The portable green power device of claim 1, further comprising:
  a commercial power receiving port on the case via which an AC charging module disposed outside the case and provided to transform AC power to DC power is electrically connected to the portable green power device, wherein the DC power is to be stored in the energy storage module.

8. The portable green power device of claim 7, wherein the AC charging module includes a conversion component to convert the AC power to the DC power.

* * * * *